United States Patent
Sun

(10) Patent No.: US 12,175,198 B2
(45) Date of Patent: Dec. 24, 2024

(54) DOCUMENT PROCESSING

(71) Applicant: BEIJING BAIDU NETCOM SCIENCE TECHNOLOGY CO., LTD., Beijing (CN)

(72) Inventor: Yingqi Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 226 days.

(21) Appl. No.: 17/952,103

(22) Filed: Sep. 23, 2022

(65) Prior Publication Data

US 2023/0022677 A1 Jan. 26, 2023

(30) Foreign Application Priority Data

Sep. 24, 2021 (CN) .......................... 202111124184.9

(51) Int. Cl.
*G06F 40/30* (2020.01)
*G06F 40/103* (2020.01)
(Continued)

(52) U.S. Cl.
CPC ............ *G06F 40/30* (2020.01); *G06F 40/103* (2020.01); *G06F 40/279* (2020.01); *G06V 30/19* (2022.01); *G06V 30/412* (2022.01)

(58) Field of Classification Search
CPC ....... G06F 40/30; G06F 40/103; G06F 40/279
See application file for complete search history.

(56) References Cited

U.S. PATENT DOCUMENTS

2009/0180126 A1* 7/2009 Matulic ................... G06F 40/30
715/243
2020/0159820 A1* 5/2020 Rodriguez ............ G06F 40/137
(Continued)

FOREIGN PATENT DOCUMENTS

CN 106250830 B 5/2019
CN 111126058 A 5/2020
(Continued)

OTHER PUBLICATIONS

LDA "Document Topic Mining and Document Static Visualization Based on LDA," (Proceedings of the National Academy of Sciences of the United States of America, PNAS, ISSN: 0027-8424) 2013, 54 pages.

*Primary Examiner* — Ibrahim Siddo
(74) *Attorney, Agent, or Firm* — Seed IP Law Group LLP

(57) ABSTRACT

A method of document processing is provided. An implementation solution is: obtaining target text information and target layout information of a target document, the target text information includes target text included in the target document and character position information of the target text, and the target layout information is used to characterize the region where text in the target document is located; fusing the target text information and the target layout information to obtain first multimodal information of the target document; and inputting the first multimodal information into an intelligent document comprehension model, and obtaining at least one target word in the target document and at least one feature vector corresponding to the at least one target word output by the intelligent document comprehension model, each target word is related to semantics of the target document.

20 Claims, 5 Drawing Sheets

(51) Int. Cl.
 *G06F 40/279* (2020.01)
 *G06V 30/19* (2022.01)
 *G06V 30/412* (2022.01)

(56) References Cited

U.S. PATENT DOCUMENTS

2021/0097143 A1 4/2021 Dozier, III et al.
2021/0256253 A1 8/2021 Chen et al.

FOREIGN PATENT DOCUMENTS

| CN | 112464641 A | 3/2021 |
| CN | 112560496 A | 3/2021 |
| CN | 113204615 A | 8/2021 |
| KR | 10-2021-0065076 A | 6/2021 |

* cited by examiner

DOCUMENT PROCESSING

CROSS REFERENCE TO RELATED APPLICATION

This application claims priority to Chinese Patent Application No. 202111124184.9, filed on Sep. 24, 2021, the contents of which are hereby incorporated by reference in their entirety for all purposes.

BACKGROUND

Technical Field

The present disclosure relates to the field of artificial intelligence, in particular to the fields of computer vision, natural language processing, and deep learning, and in particular to a document processing method, an electronic device and a computer-readable storage medium.

Description of the Related Art

Artificial intelligence is a subject that studies making computers to simulate some human thinking processes and intelligent behaviors (such as learning, reasoning, thinking, and planning), and has both hardware-level technology and software-level technology. The hardware technology of artificial intelligence generally includes sensors, dedicated artificial intelligence chips, cloud calculating, distributed storage, big data processing and other technology. The software technology of artificial intelligence mainly includes computer vision technology, speech recognition technology, natural language processing technology, machine learning/deep learning, big data processing technology, knowledge graph technology and other major directions.

Intelligent document processing is technology that comprehends and analyzes digital documents coexisting with graphics, text and tables, and extracts and structures unstructured information therein, which is widely used in various fields.

Methods described in this section are not necessarily methods that have been previously conceived or employed. Unless otherwise indicated, it should not be assumed that any of the methods described in this section qualify as prior art merely by virtue of their inclusion in this section. Similarly, unless otherwise indicated, problems raised in this section should not be considered to be recognized in any prior art.

BRIEF SUMMARY

The present disclosure provides a document processing method, an electronic device and a computer-readable storage medium.

According to an aspect of the present disclosure, a document processing method is provided, including: obtaining target text information and target layout information of a target document, wherein the target text information includes target text included in the target document and character position information of the target text, and the target layout information indicates a region where text in the target document is located; fusing the target text information and the target layout information to obtain first multimodal information of the target document; and inputting the first multimodal information into an intelligent document comprehension model, and obtaining at least one target word in the target document and at least one feature vector corresponding to the at least one target word output by the intelligent document comprehension model, wherein each target word is related to semantics of the target document.

According to yet another aspect of the present disclosure, an electronic device is provided, including: one or more processors; a memory storing one or more programs configured to be executed by the one or more processors, the one or more programs including instructions for: obtaining target text information and target layout information of a target document, wherein the target text information comprises target text of the target document and character position information of the target text, and the target layout information indicates a region where text in the target document is located; fusing the target text information and the target layout information to obtain first multimodal information of the target document; and inputting the first multimodal information into an intelligent document comprehension model, and obtaining at least one target word in the target document and at least one feature vector corresponding to the at least one target word output by the intelligent document comprehension model, wherein each target word is related to semantics of the target document.

According to yet another aspect of the present disclosure, a non-transitory computer-readable storage medium storing one or more programs is provided, the one or more programs comprising instructions, which when executed by one or more processors of an electronic device, cause the electronic device to: obtaining target text information and target layout information of a target document, wherein the target text information comprises target text of the target document and character position information of the target text, and the target layout information indicates a region where text in the target document is located; fusing the target text information and the target layout information to obtain first multimodal information of the target document; and inputting the first multimodal information into an intelligent document comprehension model, and obtaining at least one target word in the target document and at least one feature vector corresponding to the at least one target word output by the intelligent document comprehension model, wherein each target word is related to semantics of the target document.

According to one or more embodiments of the present disclosure, the target word related to the semantics of the document is obtained by using the intelligent document comprehension model based on the multimodal information of the document, so as to perform document comprehension and analysis, thereby effectively improving the accuracy and efficiency of document processing.

It should be understood that what has been described in this section is not intended to identify key or critical features of the embodiments of the present disclosure, nor is it intended to limit the scope of the present disclosure. Other features of the present disclosure will become readily understood from the following description.

BRIEF DESCRIPTION OF THE SEVERAL VIEWS OF THE DRAWINGS

The accompanying drawings illustrate embodiments and constitute a part of the specification, and together with the written description of the specification serve to explain example implementations of the embodiments. The shown embodiments are for illustrative purposes only and do not limit the scope of the claims. Throughout the accompanying drawings, the same reference numerals refer to similar but not necessarily identical elements.

DETAILED DESCRIPTION

Example embodiments of the present disclosure are described below with reference to accompanying drawings, which include various details of the embodiments of the present disclosure to facilitate understanding and should be considered as example only. Accordingly, those of ordinary skill in the art should recognize that various changes and modifications of the embodiments described herein can be made without departing from the scope of the present disclosure. Similarly, descriptions of well-known functions and constructions are omitted from the following description for clarity and conciseness.

In the present disclosure, unless otherwise specified, the use of terms "first," "second," etc., for describing various elements is not intended to limit the positional relationship, timing relationship or importance relationship of these elements, and such terms are only used to distinguish one element from another. In some examples, a first element and a second element may refer to the same instance of the elements, while in some cases they may refer to different instances based on the description of the context.

Terms used in the description of the various examples in the present disclosure are for the purpose of describing particular examples only and are not intended to be limiting. Unless the context clearly dictates otherwise, if the quantity of an element is not expressly limited, the element may be one or more. Furthermore, as used in the present disclosure, the term "and/or" covers any one and all possible combinations of listed items.

In the related art, document processing and document retrieval are realized by text matching extraction based on optical character recognition. The inventor found that this method ignores layout information of text in a document, and an effect of realizing document processing and document retrieval is poor.

The present disclosure solves, among others, the above problems. In some embodiments, the present disclosure provides a document processing method, which fuses text information and layout information of a document to obtain multimodal information of the document, and performs document comprehension based on the multimodal information of the document to obtain feature vectors semantically related to the document. This method can make full use of the text information and layout information of the document to improve the accuracy of document processing.

Embodiments of the present disclosure will be described in detail below with reference to the accompanying drawings.

Figure 1:
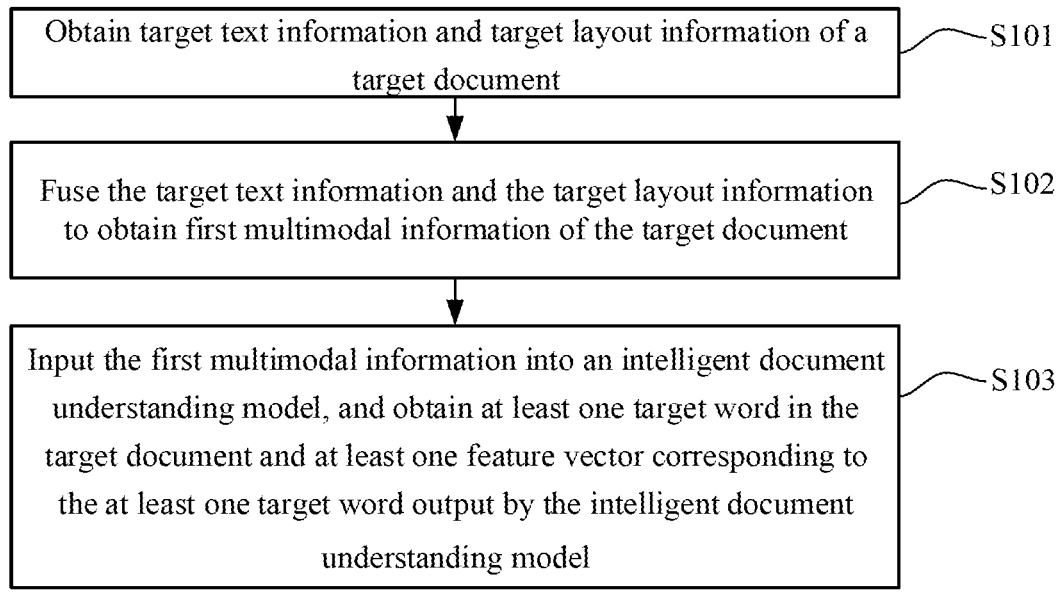
FIG. 1 shows a flowchart of a document processing method according to an embodiment of the present disclosure.

FIG. 1 shows a flowchart of a document processing method according to an example embodiment of the present disclosure. As shown in FIG. 1, the document processing method may include: step S101, target text information and target layout information of a target document are obtained; step S102, the target text information and the target layout information are fused to obtain first multimodal information of the target document; and step S103, the first multimodal information is input into an intelligent document comprehension model, and at least one target word in the target document and at least one feature vector corresponding to the at least one target word output by the intelligent document comprehension model are obtained, wherein the target text information includes target text included in the target document and character position information of the target text, the target layout information is used to characterize the region where text in the target document is located, and each target word is related to semantics of the target document.

Therefore, target words related to semantics of a document may be obtained by using the intelligent document comprehension model based on multimodal information of the document for document comprehension and analysis, so the accuracy and efficiency of document processing can be effectively improved, and end-to-end document intelligence is achieved.

According to some embodiments, the target document may be an image document. In this case, step S101 may include: the target text information and target layout information of the target document are obtained by using an optical character recognition model. Therefore, the text information and layout information of the image document can be quickly and accurately obtained, requiring less machine resources. It can be understood that the document processing method in the embodiment of the present disclosure is also applicable to text documents.

In some embodiments, the optical character recognition model may be a paddlepaddleOCR model, but is not limited thereto. For example, it may also be a model capable of realizing optical character recognition such as EasyOCR.

In some embodiments, in the case that the target text information and target layout information of the target document are obtained by using the optical character recognition model, the text information may be a character sequence, the character position information may include, but is not limited to, coordinate information of each word, and the layout information may be coordinate information of a bounding text box surrounding the character sequence. The character sequence may be divided according to information of a blank region around characters in the target document and information of intervals between the characters, for example, the character sequence may be a paragraph in the target document.

It can be understood that the first multimodal information is not limited to the above forms as long as the first multimodal information at least includes the text information and layout information of the target document, which is not limited.

In some embodiments, each target word in the target document may be a word composed of one character or a word composed of a plurality of characters, which is not limited.

According to some embodiments, the document processing method further includes: after the first multimodal information is input into the intelligent document comprehension model, and at least one target word in the target document and the feature vector corresponding to the at least one target word output by the intelligent document comprehension model are obtained, comprehension information of the target document is obtained based on the feature vector corresponding to the at least one target word and position information of the at least one target word. In this case, various downstream tasks may be carried out based on the at least one target word in the target document and the feature vector corresponding to the at least one target word, realizing end-to-end document intelligence.

In some embodiments, the position information of the at least one target word may be obtained based on the character position information of the target text. In this case, the position information of each target word may be obtained based on the position information of the characters included in the target word. For example, it may be position information of a bounding text box surrounding the target word determined based on the position information of the characters included in the target word, which may specifically include a length, a width and coordinate information of a center of the bounding text box, or may include coordinate information of all vertexes of the bounding text box. It can be understood that the above is only an example representation of the position information of the target word, and it is not limited that the position information of the target word can only be this representation. For example, the position information of the target word may also be represented directly by the position information of the characters included in the target word.

In some embodiments, output of the intelligent document comprehension model may also include the position information of the at least one target word.

In an embodiment, the comprehension information includes paragraph information, and the paragraph information is spliced based on the at least one target word and the position information of the at least one target word. In this case, the paragraph information is a key content summary of the target document, semantic content of the document may be easily obtained based on the paragraph information, and applications in various scenarios may be supported.

In an embodiment, the obtaining the comprehension information of the target document may include: the feature vector corresponding to the at least one target word and the position information of the at least one target word are input into a content comprehension model, and paragraph information output by the content comprehension model is obtained. The content comprehension model may learn, based on the input feature vector corresponding to the at least one target word and the position information of the at least one target word, semantic features and corresponding relationships contained therein, and output the key content summary of the target document.

In an embodiment, the content comprehension model may be obtained by, for example, the following training method: a training sample set is obtained, wherein the training sample set includes at least one training sample, and each training sample includes at least one feature vector corresponding to at least one sample word and position information of the at least one sample word; sample paragraph information corresponding to each training sample is obtained; the feature vector corresponding to the at least one sample word and the position information of the at least one sample word are input into the content comprehension model, and predicted paragraph information output by the content comprehension model is obtained; a loss value is calculated based on the sample paragraph information and the predicted paragraph information; and parameters of the content comprehension model are adjusted based on the loss value until the loss value is less than a preset loss threshold value.

It can be understood that the method for obtaining the content comprehension model through the above training steps is only an example of the content comprehension model, rather than a limitation on the document processing method described in the present disclosure.

In an embodiment, the comprehension information includes key-value information, and the key-value information is determined based on the at least one target word and the position information of the at least one target word. In this case, the key-value information is key entity information contained in the target document, and based on the key-value information, the key entity information in the document may be extracted to support business-related applications.

In an embodiment, the obtaining the comprehension information of the target document may include: the feature vector corresponding to the at least one target word and the position information of the at least one target word are input into a labeling constraint model, and the key-value information included in the target document output by the labeling constraint model is obtained. The labeling constraint model may extract, based on the input feature vector corresponding to the at least one target word and the position information of the at least one target word, key entity information contained therein and a corresponding relationship thereof, and mark it as key-value information required in a business scenario for output.

In an embodiment, the labeling constraint model may be obtained by, for example, the following training method: a training sample set is obtained, wherein the training sample set includes at least one training sample, and each training sample includes at least one feature vector corresponding to at least one sample word and position information of the at least one sample word; sample key-value information corresponding to each training sample is obtained; the feature vector corresponding to the at least one sample word and the position information of the at least one sample word are input into the labeling constraint model, and predicted key-value information output by the labeling constraint model is obtained; a loss value is calculated based on the sample key-value information and the predicted key-value information; and parameters of the labeling constraint model are adjusted based on the loss value until the loss value is less than a preset loss threshold value.

It can be understood that the method for obtaining the labeling constraint model through the above training steps is only an example of the labeling constraint model, rather than a limitation on the document processing method described in the present disclosure.

The example embodiments will be further described below with reference to an example.

For example, text content of the target document is: "Zhang San is a doctor, and Li is a teacher". According to the above document processing method, the target words of the target document may be obtained as: "Zhang San," "doctor," "Li," "teacher" and their respective corresponding feature vectors, and the feature vectors contain their respective corresponding semantic feature information and relative position feature information. In this case, required key-value information is name information and corresponding occupation information, respectively. The feature vectors corresponding to "Zhang San," "doctor," "Li" and "teacher" are input into the content comprehension model, based on their respective corresponding feature vectors and position information, "Zhang San" and "Li" may be marked as the name information, "doctor and "teacher" may be marked as the corresponding occupation information, and the required key-value information "Zhang San-doctor" and "Li-teacher" is output.

Figure 2:
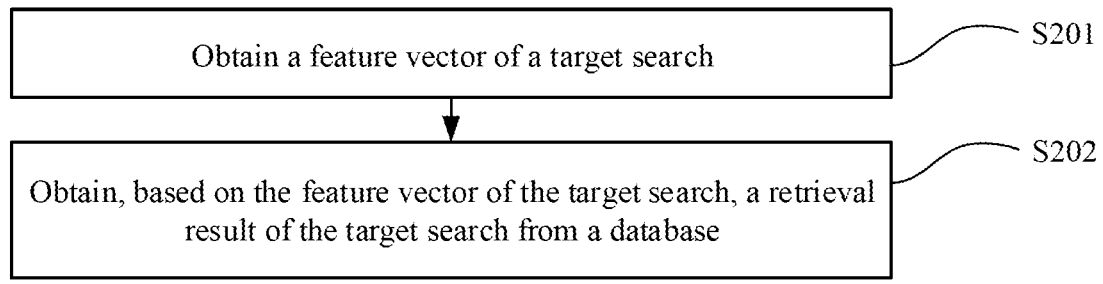
FIG. 2 shows a flowchart of a document retrieval method according to an embodiment of the present disclosure.

FIG. 2 shows a flowchart of a document retrieval method according to an embodiment of the present disclosure.

According to an aspect of the present disclosure, a document retrieval method is provided. As shown in FIG. 2, the document retrieval method may include: S201, a feature vector of a target search is obtained; and S202, a retrieval result of the target search is obtained from a database based on the feature vector of the target search, wherein the feature vector of the target search is obtained by using the above document processing method, the database includes a plurality of documents and at least one feature vector corresponding to at least one word included in each document, and the at least one word included in each document and the feature vector corresponding to the at least one word are obtained by using the above document processing method. In this way, the semantically related feature vectors obtained from document comprehension can be effectively used to achieve quick and accurate retrieval.

In step S201, the feature vector of the target search may also be obtained by using the above document processing method.

According to some embodiments, the retrieval result includes at least one matching document, matching the target search, in the database and at least one matching word, related to the at least one target search, in each matching document. Therefore, the corresponding matching document and content, matching the target search, in the document can be accurately displayed to a user based on the target search, improving user experience.

In an embodiment, the feature vector corresponding to the at least one word included in each document in the database is obtained by using the above document processing method, and is formed by splicing a semantic feature vector of the at least one word and a relative position feature vector of the at least one word in the document. In this case, the feature vector of the target search may be obtained by using the above document processing method, and is formed by splicing a semantic feature vector of the target search and a blank relative position feature vector. It can be understood that the above method for obtaining the feature vector by splicing is only an example of an expression form of the feature vector, rather than a limitation on the document processing method described in the present disclosure. For example, the feature vector of the target search may also be formed by splicing the semantic feature vector of the target search and a relative position feature vector of a default value.

In an embodiment, obtaining the retrieval result of the target search from the database based on the feature vector of the target search may include: a similarity of the feature vector of the target search and the feature vector corresponding to the at least one word included in each document in the database is calculated; similarity calculation results of the feature vector of the target search and the feature vector corresponding to the at least one word included in each document in the database are sorted; and at least one word with the highest similarity calculation result is used as matching words, in response to the quantity of the matching words being greater than a preset value, a corresponding document is used as the matching document, and the retrieval result is output. It can be understood that the above retrieval method is only an example of the document retrieval method, rather than a limitation of the document retrieval method described in the present disclosure. For example, at least one word with similarity calculation results greater than the preset threshold may also be used as matching words.

Figure 3:
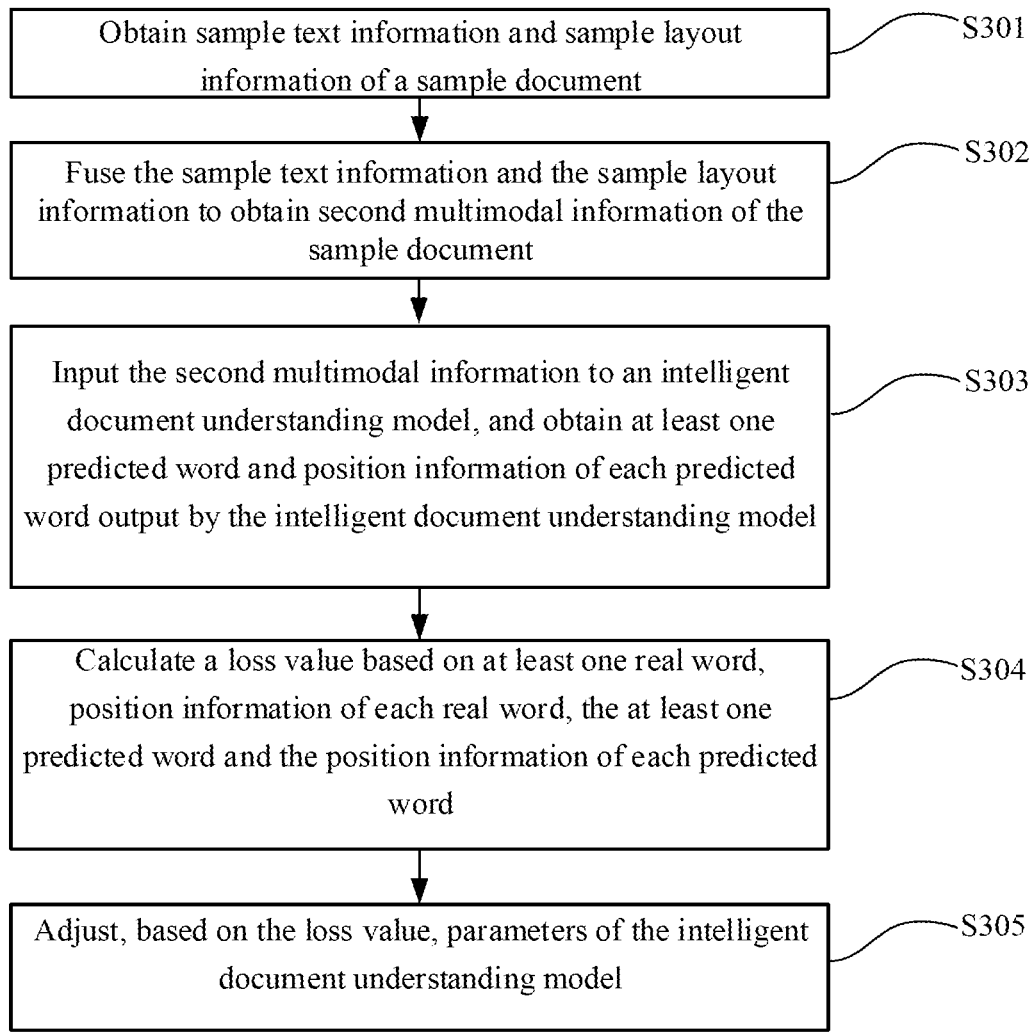
FIG. 3 shows a flowchart of a training method for an intelligent document comprehension model according to an embodiment of the present disclosure.

FIG. 3 shows a flowchart of a training method for a document intelligent comprehension according to an embodiment of the present disclosure.

According to an aspect of the present disclosure, a training method for a document intelligent comprehension model is provided. As shown in FIG. 3, the training method for the intelligent document comprehension model may include: S301, sample text information and sample layout information of a sample document are obtained; S302, the sample text information and the sample layout information are fused to obtain second multimodal information of the sample document; S303, the second multimodal information is input into the intelligent document comprehension model, and at least one predicted word and position information of each predicted word output by the intelligent document comprehension model are obtained; S304, a loss value is calculated based on at least one real word, position information of each real word, the at least one predicted word and the position information of each predicted word; and S305, parameters of the intelligent document comprehension model are adjusted based on the loss value, wherein the sample text information includes sample text in the sample document and character position information of the sample text, the sample layout information is used to characterize the region where text in the sample document is located, the second multimodal information includes the at least one real word marked by a mask and the position information of each real word, and the at least one real word is related to semantics of the sample document.

It can be understood that since marking by the mask is performed on the real words related to the semantics of the sample document in a targeted manner in the above training method, the above method can strengthen the model's capacity to extract words representing key semantics in the document, the intelligent document comprehension model with higher learning capacity on text semantic features and layout features of the document is obtained, and by using the intelligent document comprehension model trained by this method, the accuracy of document processing can be improved.

According to some embodiments, the intelligent document comprehension model is a pre-trained model, and the pre-trained model is fine-adjusted by using the sample document. The pre-trained model may be, for example, an ernie model. It can be understood that the pre-trained model may also be other types of pre-trained models, for example, it may also be a BERT model.

According to some embodiments, the target document may be an image document. In this case, step S301 may include: target text information and target layout information of the target document are obtained by using an optical character recognition model. Therefore, the text information and layout information of the image document can be quickly and accurately obtained, requiring less machine resources, and improving performance of the model.

In some embodiments, the optical character recognition model may be a paddlepaddleOCR model, but is not limited thereto, for example, it may also be a model capable of realizing optical character recognition such as EasyOCR.

In some embodiments, in the case that the sample text information and sample layout information of the sample document are obtained by using the optical character recognition model, the text information may be a character sequence, the character position information may include, but is not limited to, coordinate information of each word, and the layout information may be coordinate information of a bounding text box surrounding the character sequence. The character sequence may be divided according to information of a blank region around the characters in the document and information of intervals between the characters, for example, the character sequence may be a paragraph in the document.

It can be understood that the second multimodal information is not limited to the above form as long as the second multimodal information includes at least the text information and layout information of the sample document, which is not limited.

In the above example, the second multimodal information including the at least one real word marked by the mask and the position information of each real word may be obtained by, for example, the following method: at least one real word, related to the semantics, in the sample text information of the sample document and the position information of each real word are obtained; and marking with the mask is performed on the at least one real word, related to the semantics, in the sample text information of the sample document to obtain the second multimodal information including the at least one real word marked by the mask and the position information of each real word. It can be understood that obtaining of the second multimodal information is not limited to the above method, which is not limited.

An embodiment will be further described below with reference to an example.

For example, text content of the sample document is: "Zhang San is a doctor, and Li Si and Zhang San have the same occupation as a doctor." It can be seen that "doctor" is one of the words in the document that represent key semantics. According to the above method for obtaining the second multimodal information, after marking "doctor" with a mask, text content corresponding to the second multimodal information may be obtained as: "Zhang San is a doctor, and Li Si and Zhang San have the same occupation as a [mask]." The model is trained based on the above second multimodal information, and the model is required to deeply learn text semantic features and layout features of the document to obtain predicted words. In this way, the capacity of the model to extract words representing key semantics in the document can be strengthened, and the intelligent document comprehension model with optimized performance is obtained. It can be understood that [mask] is only for ease of understanding, and it does not participate in the training process.

Figure 4:
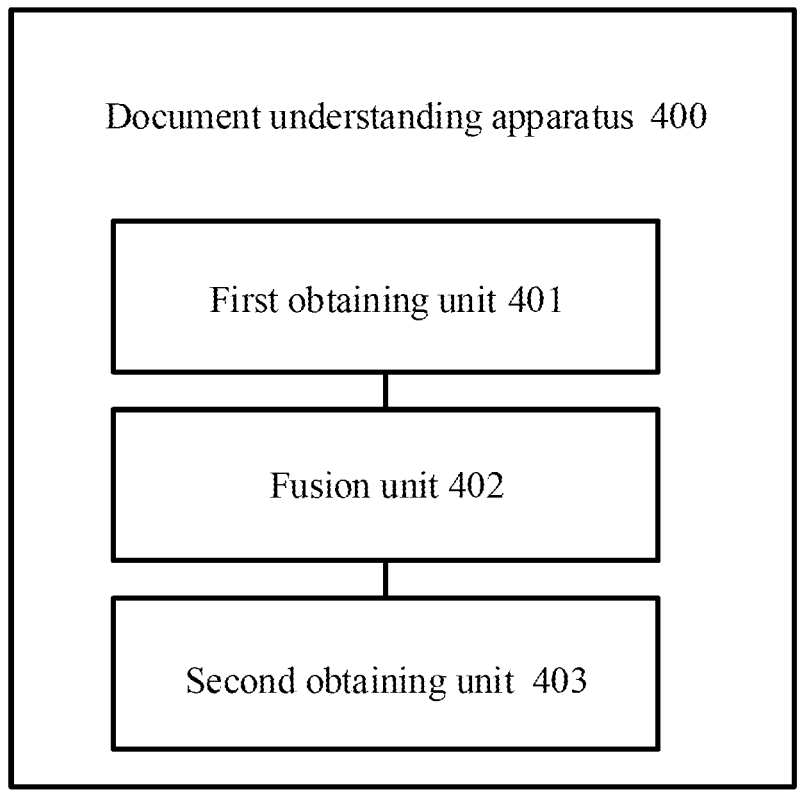
FIG. 4 shows a structural block diagram of a document processing apparatus according to an embodiment of the present disclosure.

FIG. 4 shows a structural block diagram of a document processing apparatus according to an embodiment of the present disclosure.

According to an aspect of the present disclosure, a document processing apparatus 400 is provided, including: a first obtaining unit 401, configured to obtain target text information and target layout information of a target document, wherein the target text information includes target text included in the target document and character position information of the target text, and the target layout information is used to characterize the region where text in the target document is located; a fusion unit 402, configured to fuse the target text information and the target layout information to obtain first multimodal information of the target document; and a second obtaining unit 403, configured to input the first multimodal information into an intelligent document comprehension model, and obtain at least one target word in the target document and at least one feature vector corresponding to the at least one target word output by the intelligent document comprehension model, wherein each target word is related to semantics of the target document.

Operations of the unit 401 to the unit 403 of the document processing apparatus 400 are similar to operations of step S101 to step S103 described above, and are not repeated here.

According to some embodiments, the document processing apparatus 400 may further include a third obtaining unit, configured to obtain, based on the feature vector corresponding to the at least one target word and position information of the at least one target word, comprehension information of the target document. Operations of the third obtaining unit are similar to the method described above, and are not repeated here.

According to some embodiments, the comprehension information includes paragraph information, the paragraph information is spliced based on the at least one target word and the position information of the at least one target word, and the third obtaining unit includes: a first sub-obtaining unit, configured to input the feature vector corresponding to the at least one target word and the position information of the at least one target word into a content comprehension model, and obtain paragraph information output by the content comprehension model.

According to some embodiments, the comprehension information includes key-value information, the key-value information is determined based on the at least one target word and the position information of the at least one target word, and the third obtaining unit includes: a second sub-obtaining unit, configured to input the feature vector corresponding to the at least one target word and the position information of the at least one target word into a labeling constraint model, and obtain key-value information included in the target document output by the labeling constraint model.

According to some embodiments, the target document is an image document.

According to some embodiments, the first obtaining unit may be configured to obtain the target text information and target layout information of the target document by using an optical character recognition model.

Figure 5:
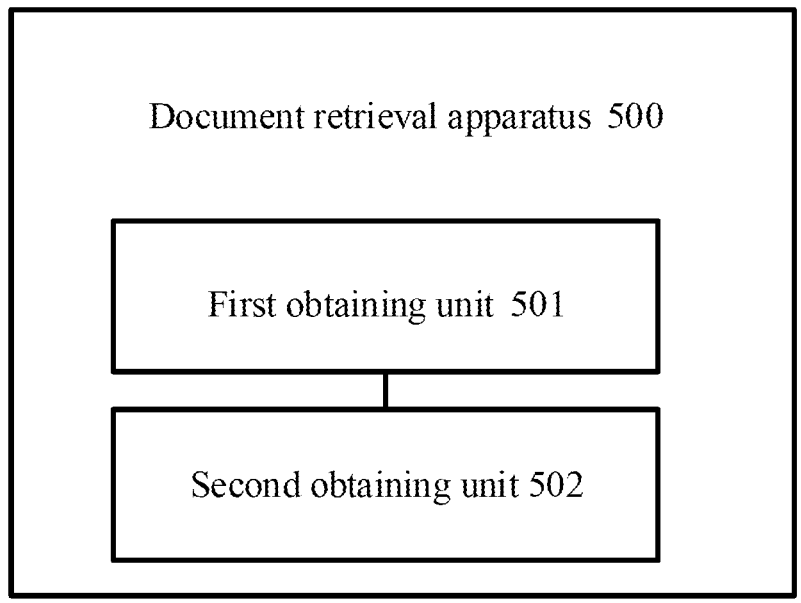
FIG. 5 shows a structural block diagram of a document retrieval apparatus according to an embodiment of the present disclosure.

FIG. 5 shows a structural block diagram of a document retrieval apparatus according to an embodiment of the present disclosure.

According to an aspect of the present disclosure, a document retrieval apparatus 500 is provided, including: a first obtaining unit 501, configured to obtain a feature vector of a target search; and a second obtaining unit 502, configured to obtain, based on the feature vector of the target search, a retrieval result of the target search from a database, wherein the database includes a plurality of documents and at least one feature vector corresponding to at least one word included in each document, and the at least one word included in each document and the feature vector corresponding to the at least one word are obtained by using the above document processing method.

Operations of the unit 501 and the unit 502 of the document processing apparatus 500 are similar to operations of step S201 and step S202 described above, and are not repeated here.

According to some embodiments, the retrieval result includes at least one matching document, matching the target search, in the database and at least one matching word, related to the at least one target search, in each matching document.

Figure 6:
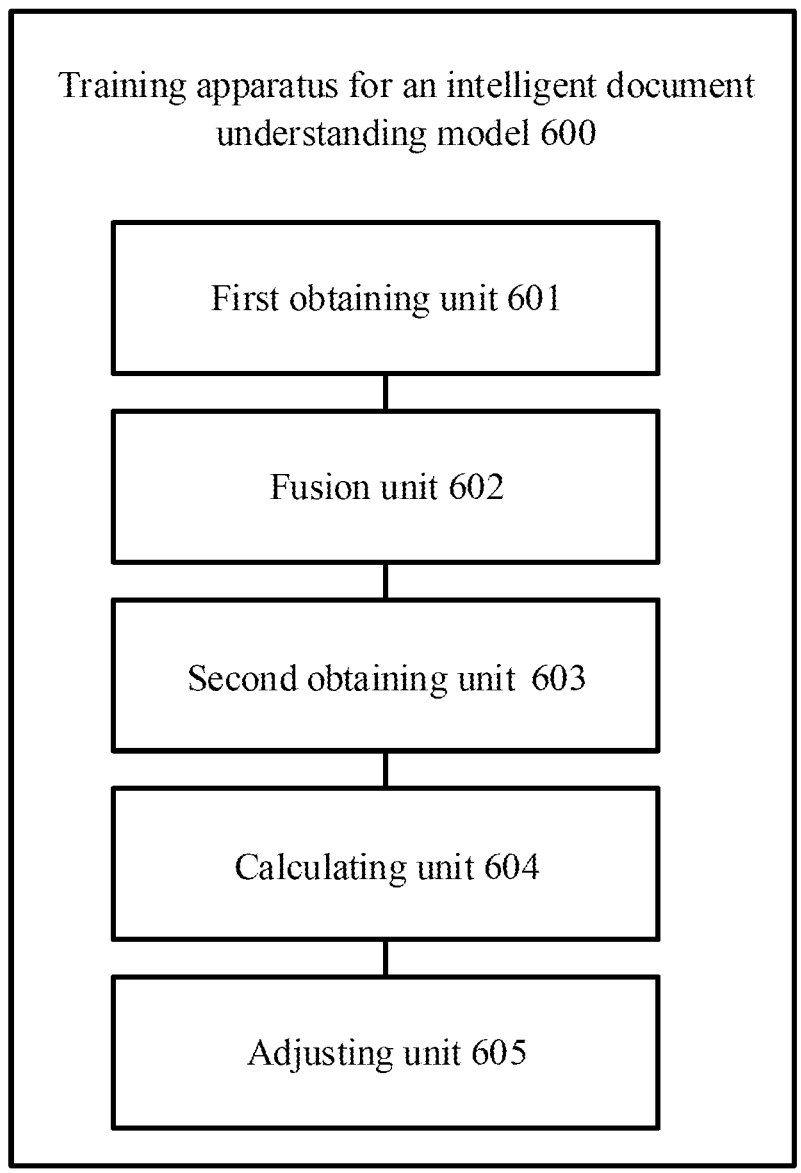
FIG. 6 shows a structural block diagram of a training apparatus for an intelligent document comprehension model according to an embodiment of the present disclosure.

FIG. 6 shows a structural block diagram of a training apparatus for an intelligent document comprehension model according to an embodiment of the present disclosure.

According to an aspect of the present disclosure, a training apparatus 600 for an intelligent document comprehension model is provided, including: a first obtaining unit 601, configured to obtain sample text information and sample layout information of a sample document, wherein the sample text information includes sample text in the sample document and character position information of the sample text, and the sample layout information is used to characterize the region where text in the sample document is located; a fusion unit 602, configured to fuse the sample text information and the sample layout information to obtain second multimodal information of the sample document, wherein the second multimodal information includes at least one real word marked by a mask and position information of each real word, and the at least one real word is related to semantics of the sample document; a second obtaining unit 603, configured to input the second multimodal information into the intelligent document comprehension model, and obtain at least one predicted word and position information of each predicted word output by the intelligent document comprehension model; a calculating unit 604, configured to calculate a loss value based on the at least one real word, the position information of each real word, the at least one predicted word and the position information of each predicted word; and an adjusting unit 605, configured to adjust, based on the loss value, parameters of the intelligent document comprehension model.

Operations of the unit 601 to the unit 605 of the training apparatus 600 for the intelligent document comprehension model are similar to operations of step S301 to step S305 described above, and are not repeated here.

According to some embodiments, the intelligent document comprehension model is a pre-trained model, and the pre-trained model is fine-adjusted by using the sample document.

According to some embodiments, the sample document is an image document.

According to some embodiments, the first obtaining unit is configured to obtain the sample text information and sample layout information of the sample document by using an optical character recognition model.

According to an aspect of the present disclosure, an electronic device is further provided, including: at least one processor; and a memory in communication connection to the at least one processor, wherein the memory stores instructions executable by the at least one processor, and the instructions are executed by the at least one processor so that the at least one processor is able to execute at least one of the above document processing method, document retrieval method and training method for the intelligent document comprehension model.

According to an aspect of the present disclosure, a non-transitory computer-readable storage medium storing computer instructions is further provided, wherein the computer instructions are configured to enable a computer to execute at least one of the above document processing method, document retrieval method and training method for the intelligent document comprehension model.

According to an aspect of the present disclosure, a computer program product is further provided, including a computer program, wherein the computer program, when executed by a processor, implements at least one of the above document processing method, document retrieval method and training method for the intelligent document comprehension model.

Figure 7:
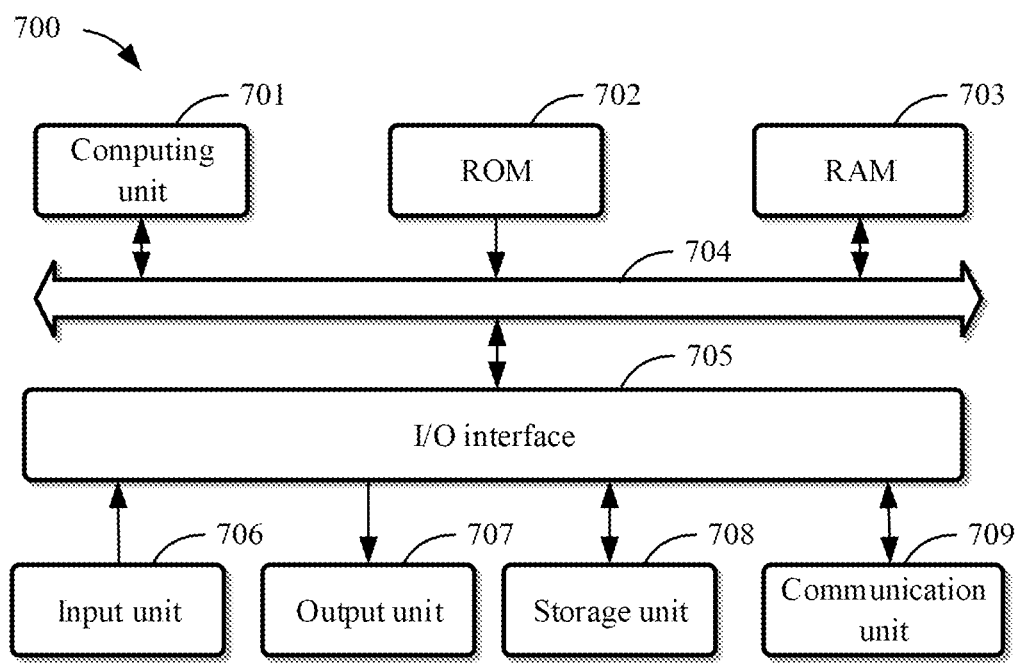
FIG. 7 shows a block diagram of an electronic device that may be configured to implement embodiments of the present disclosure.

Referring to FIG. 7, a structural block diagram of an electronic device 700 that may act as a server or client of the present disclosure will be described, which is an example of a hardware device that may be applied to various aspects of the present disclosure. The electronic device is intended to represent various forms of digital electronic computer devices, such as laptop computers, desktop computers, workstations, personal digital assistants, servers, blade servers, mainframe computers, and other suitable computers. The electronic device may also represent various forms of mobile devices, such as personal digital processors, cellular phones, smart phones, wearable devices, and other similar calculating devices. The components shown herein, their connections and relationships, and their functions are by way of example only, and are not intended to limit implementations of the present disclosure described and/or claimed herein.

As shown in FIG. 7, the device 700 includes a calculating unit 701, which may perform various appropriate actions and processes according to a computer program stored in a read only memory (ROM) 702 or a computer program loaded into a random access memory (RAM) 703 from a storage unit 708. In the RAM 703, various programs and data necessary for the operation of the device 700 may also be stored. The calculating unit 701, the ROM 702, and the RAM 703 are connected to each other through a bus 704. An input/output (I/O) interface 705 is also connected to the bus 704.

Various components in the device 700 are connected to the I/O interface 705, including: an input unit 706, an output unit 707, the storage unit 708, and a communication unit 709. The input unit 706 may be any type of device capable of inputting information to the device 700. The input unit 706 may receive input numerical or character information, and generate key signal input related to user settings and/or function control of the electronic device, and may include, but is not limited to, a mouse, a keyboard, a touch screen, a trackpad, a trackball, a joystick, a microphone and/or a remote control. The output unit 707 may be any type of device capable of presenting information, and may include, but is not limited to, a display, speakers, video/audio output terminals, vibrators, and/or printers. The storage unit 708 may include, but is not limited to, magnetic disks and compact discs. The communication unit 709 allows the device 700 to exchange information/data with other devices through a computer network such as the Internet and/or various telecommunication networks, and may include, but is not limited to, modems, network cards, infrared communication devices, wireless communication transceivers and/or chips groups, such as Bluetooth™ devices, 802.11 devices, WiFi devices, WiMax devices, cellular communication devices and/or the like.

The calculating unit 701 may be various general purpose and/or special purpose processing components with processing and calculating capabilities. Some examples of the calculating unit 701 include, but are not limited to, central processing units (CPUs), graphics processing units (GPUs), various specialized artificial intelligence (AI) calculating chips, various calculating units that run machine learning model algorithms, digital signal processors (DSPs), and any suitable processor, controller, microcontroller, etc. The calculating unit 701 executes the various methods and processes described above, such as at least one of the above document processing method, document retrieval method and training method for the intelligent document comprehension model. For example, in some embodiments, the above document processing method, document retrieval method and training method for the intelligent document comprehension model may be implemented as computer software programs tangibly embodied on a machine-readable medium, such as the storage unit 708. In some embodiments, part or all of the computer programs may be loaded and/or installed on the device 700 via the ROM 702 and/or the communication unit 709. When the computer programs are loaded to the RAM 703 and executed by the calculating unit 701, one or more steps of the document processing method, the document retrieval method and the training method for the intelligent document comprehension model described above may be performed. Alternatively, in other embodiments, the calculating unit 701 may be configured to execute at least one of the above document processing method, document retrieval method and training method for the intelligent document comprehension model by any other suitable means (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a load programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally remote from each other and usually interact through a communication network. The relationship of the client and the server arises by computer programs running on corresponding computers and having a client-server relationship to each other. The server may be a cloud server, a server of a distributed system, or a server combined with blockchain.

It should be understood that steps may be reordered, added or deleted using the various forms of flow shown above. For example, the steps described in the present disclosure may be performed in parallel, sequentially or in different orders, and are not limited herein as long as desired results of a technical solution disclosed by the present disclosure may be achieved.

Although the embodiments or examples of the present disclosure have been described with reference to the accompanying drawings, it should be understood that the above methods, systems and devices are merely embodiments or examples, and the scope of the present disclosure is not limited by these embodiments or examples, but is limited only by the appended claims and their equivalents. Various elements of the embodiments or examples may be omitted or replaced by equivalents thereof. Furthermore, the steps may be performed in an order different from that described in the present disclosure. Further, the various elements of the embodiments or examples may be combined in various ways. Importantly, as technology evolves, many of the elements described herein may be replaced by equivalent elements that appear later in the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented document processing method, comprising:
   obtaining target text information and target layout information of a target document, wherein the target text information comprises target text of the target document and character position information of the target text, and the target layout information indicates a region where text in the target document is located;
   fusing the target text information and the target layout information to obtain first multimodal information of the target document; and
   inputting the first multimodal information into an intelligent document comprehension model, and obtaining at least one target word in the target document and at least one feature vector corresponding to the at least one target word output by the intelligent document comprehension model, wherein each target word is related to semantics of the target document.

2. The method according to claim 1, further comprising:
   obtaining, based on the feature vector corresponding to the at least one target word and position information of the at least one target word, comprehension information of the target document.

3. The method according to claim 2, wherein the comprehension information comprises paragraph information, the paragraph information is spliced based on the at least one target word and the position information of the at least one target word, and the obtaining comprehension information of the target document comprises:
   inputting the at least one feature vector corresponding to the at least one target word and the position information of the at least one target word into a content comprehension model, and obtaining paragraph information output by the content comprehension model.

4. The method according to claim 2, wherein the comprehension information comprises key-value information, the key-value information is determined based on the at least one target word and the position information of the at least one target word, and the obtaining comprehension information of the target document comprises:
   inputting the feature vector corresponding to the at least one target word and the position information of the at least one target word into a labeling constraint model, and obtaining key-value information of the target document output by the labeling constraint model.

5. The method according to claim 1, wherein the target document is an image document.

6. The method according to claim 5, wherein the obtaining comprehension information of the target document comprising:
   obtaining the target text information and target layout information of the target document by using an optical character recognition model.

7. The method according to claim 1, further comprising:
   establishing a database that includes a plurality of documents, each document in the plurality of documents includes at least one feature vector corresponding to at least one word included in the document,
   obtaining a feature vector of a target search; and
   obtaining, based on the feature vector of the target search, a retrieval result of the target search from the database.

8. The method according to claim 7, wherein the retrieval result comprises at least one matching document that matches the target search, in the database and at least one matching word, related to the at least one target search, in each matching document.

9. The method according to claim 1, wherein the intelligent document comprehension model is trained through acts including:
   obtaining sample text information and sample layout information of a sample document, wherein the sample text information comprises sample text in the sample document and character position information of the sample text, and the sample layout information is used to characterize the region where text in the sample document is located;
   fusing the sample text information and the sample layout information to obtain second multimodal information of the sample document, wherein the second multimodal information comprises at least one real word marked by a mask and position information of each real word, and the at least one real word is related to semantics of the sample document;
   inputting the second multimodal information into the intelligent document comprehension model, and obtaining at least one predicted word and position information of each predicted word output by the intelligent document comprehension model;
   calculating a loss value based on the at least one real word, the position information of each real word, the at least one predicted word and the position information of each predicted word; and
   adjusting, based on the loss value, parameters of the intelligent document comprehension model.

10. The method according to claim 9, wherein the intelligent document comprehension model is a pre-trained model, and the pre-trained model is fine-adjusted by using the sample document.

11. The method according to claim 9, wherein the sample document is an image document.

12. The method according to claim 11, wherein the sample text information and sample layout information of the sample document are obtained by using an optical character recognition model.

13. An electronic device, comprising:
   one or more processors;
   a memory storing one or more programs configured to be executed by the one or more processors, the one or more programs including instructions for:
      obtaining target text information and target layout information of a target document, wherein the target text information comprises target text of the target document and character position information of the target text, and the target layout information indicates a region where text in the target document is located;

fusing the target text information and the target layout information to obtain first multimodal information of the target document; and inputting the first multimodal information into an intelligent document comprehension model, and obtaining at least one target word in the target document and at least one feature vector corresponding to the at least one target word output by the intelligent document comprehension model, wherein each target word is related to semantics of the target document.

14. The electronic device according to claim 13, wherein the one or more programs comprising instructions for:

obtaining, based on the feature vector corresponding to the at least one target word and position information of the at least one target word, comprehension information of the target document.

15. The electronic device according to claim 14, wherein the comprehension information comprises paragraph information, the paragraph information is spliced based on the at least one target word and the position information of the at least one target word, and the obtaining comprehension information of the target document comprises:

inputting the at least one feature vector corresponding to the at least one target word and the position information of the at least one target word into a content comprehension model, and obtaining paragraph information output by the content comprehension model.

16. The electronic device according to claim 14, wherein the comprehension information comprises key-value information, the key-value information is determined based on the at least one target word and the position information of the at least one target word, and the obtaining comprehension information of the target document comprises:

inputting the at least one feature vector corresponding to the at least one target word and the position information of the at least one target word into a labeling constraint model, and obtaining key-value information of the target document output by the labeling constraint model.

17. The electronic device according to claim 13, wherein the target document is an image document.

18. The electronic device according to claim 17, wherein the obtaining comprehension information of the target document comprising:

obtaining the target text information and target layout information of the target document by using an optical character recognition model.

19. A non-transient computer-readable storage medium storing one or more programs, the one or more programs comprising instructions, which when executed by one or more processors of an electronic device, cause the electronic device to:

obtaining target text information and target layout information of a target document, wherein the target text information comprises target text of the target document and character position information of the target text, and the target layout information indicates a region where text in the target document is located;

fusing the target text information and the target layout information to obtain first multimodal information of the target document; and inputting the first multimodal information into an intelligent document comprehension model, and obtaining at least one target word in the target document and at least one feature vector corresponding to the at least one target word output by the intelligent document comprehension model, wherein each target word is related to semantics of the target document.

20. The non-transitory computer-readable storage medium according to claim 19, wherein the one or more programs comprising instructions for:

obtaining, based on the feature vector corresponding to the at least one target word and position information of the at least one target word, comprehension information of the target document.

* * * * *